United States Patent [19]

Rosen

[11] 4,160,001
[45] Jul. 3, 1979

[54] COPOLYMER BLENDS

[75] Inventor: Irving Rosen, Warrensville Heights, Ohio

[73] Assignee: The Standard Oil Company, Cleveland, Ohio

[21] Appl. No.: 825,643

[22] Filed: Aug. 18, 1977

[51] Int. Cl.² ............................................. C08L 51/04
[52] U.S. Cl. ................................. 525/230; 525/209; 525/213; 525/72; 525/76; 525/84; 525/83
[58] Field of Search .............. 260/876 R, 893, 880 R, 260/881

[56] References Cited

U.S. PATENT DOCUMENTS

| | | | |
|---|---|---|---|
| 3,917,748 | 11/1975 | Vincent et al. ................... | 260/880 R |
| 3,922,321 | 11/1975 | Yusa et al. ........................ | 260/881 X |
| 3,985,827 | 10/1976 | Hicks ................................ | 260/876 R |
| 3,988,391 | 10/1976 | Hart et al. ........................ | 260/876 R |
| 4,021,509 | 5/1977 | Murayama et al. ......... | 260/876 R X |
| 4,025,581 | 5/1977 | Powell et al. ............. | 260/876 R X |

*Primary Examiner*—Thomas DeBenedictis
*Attorney, Agent, or Firm*—John F. Jones; Larry W. Evans

[57] ABSTRACT

Blends of a copolymer of methyl methacrylate and styrene with an acrylonitrile-styrene copolymer have improved optical, mechanical and gas barrier properties as well as improved processability.

6 Claims, No Drawings

COPOLYMER BLENDS

This invention relates to novel blends of a copolymer of methyl methacrylate and styrene with acrylonitrile-vinyl aromatic monomer copolymers which have improved optical, mechanical and gas barrier properties and substantially improved processability.

The blends of this invention are composed of two polymer components—namely, first a copolymer of methyl methacrylate-styrene and second a nitrile copolymer containing a major amount of polymerized acrylonitrile, a vinyl aromatic monomer such as styrene, and optionally a diene rubber. Both polymer components are thermoplastics.

The thermoplastic nitrile resins useful in this invention are prepared by polymerizing a major portion of an olefinically unsaturated nitrile, such as acrylonitrile, and a minor portion of another monomer component copolymerizable with said olefinically unsaturated nitrile, and optionally a conjugated diene rubber.

The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3, and the like. Most preferred are butadiene and isoprene.

The olefinically unsaturated nitriles useful in this invention are the alpha,beta-olefinically unsaturated mononitriles having the structure

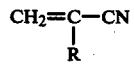

wherein R is hydrogen, a lower alkyl group having from 1 to 4 carbon atoms, or a halogen. Such compounds include acrylonitrile, alphachloroacrylonitrile, alpha-fluoroacrylonitrile, methacrylonitrile, ethacrylonitrile, and the like. The most preferred are acrylonitrile, methacrylonitrile, and mixtures thereof.

The vinyl aromatic monomers include styrene, alphamethyl styrene, the vinyl toluenes, the vinyl xylenes, and the like. Most preferred is styrene.

Nitrile polymers useful in this invention are those prepared by the polymerization of 100 parts by weight of (A) more than 50% by weight of at least one nitrile having the structure

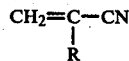

wherein R has the foregoing designation, and (B) less than 50% by weight based on the combined weight of (A) plus (B) of styrene, in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure

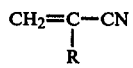

wherein R has the foregoing designation, and an ester having the structure

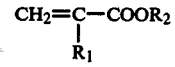

wherein $R_1$ is hydrogen, an alkyl group having from 1 to 4 carbon atoms, or a halogen, and $R_2$ is an alkyl group having from 1 to 6 carbon atoms, said rubbery polymer containing from 50 to 100% by weight of polymerized conjugated diene and from 0 to 50% by weight of comonomer. In the foregoing nitrile copolymers, it is preferred that (A) be present in from 70 to 90% by weight.

The copolymers of methyl methacrylate and styrene useful in this invention are those composed of from about 50 to 70% by weight of methyl methacrylate and correspondingly from 50 to 30% by weight of styrene.

The blends of methyl methacrylate-styrene copolymers with the nitrile copolymers are made up of from about 2 to 60% by weight and preferably 5 to 50% by weight of the methyl methacrylate-styrene copolymer and correspondingly from about 98 to 40% by weight and preferably 95 to 50% by weight of the nitrile copolymer.

The methyl methacrylate-styrene copolymer and the nitrile copolymer components of the blends of this invention can each be prepared by any of the known general techniques of polymerization, including the bulk polymerization, solution polymerization, and emulsion or suspension polymerization techniques by batch, continuous, or intermittent addition of the monomers and other components. Usually these copolymers are prepared in aqueous medium in the presence of an emulsifying or suspending agent and a free-radical generating polymerization initiator at a temperature of from about 0° to 100° C. in the substantial absence of molecular oxygen. The blends have unexpectedly good gas barrier properties which are far superior to what one would expect from the gas barrier properties of the individual copolymers.

The novel polymeric blends of this invention are readily processed thermoplastic materials which can be thermoformed into a wide variety of useful articles in any of the conventional ways such as by milling, extrusion, molding, drawing, blowing, etc. The polymeric blends of this invention have excellent solvent resistance and their low permeability to gases and impact resistance in the case where rubber modified make them useful in the manufacture of pipes, conduits, rods, bottles, film, sheets and coatings.

In the following illustrative examples, the amounts of ingredients are expressed in parts by weight unless otherwise indicated.

EXAMPLE 1

A. A blend of 5 parts by weight of a 60:40 percent by weight copolymer of methyl methacrylate:styrene and 95 parts by weight of a uniform copolymer of 80:20 percent by weight copolymer of acrylonitrile:styrene was prepared by milling the mixture on a two-roll mill at 320° F. for 4 minutes followed by compression molding of test plaques at 320° F. and 100 psig.

The oxygen transmission was determined on a film pressed from a plaque employing an Oxtran 1050 instrument at 23° C. and 100% relative humidity. The oxygen transmission rate was found to be 0.6 cc./mil/100 inches$^2$/24 hours/atmosphere. Other properties for this blend were 630,000 psi flexural modulus and 95° C. ASTM heat-distortion temperature at 264 psi.

B. A repeat of A above except that 100 parts of 60:40 methyl methacrylate:styrene copolymer and no acrylonitrile:styrene copolymer were used produced a polymer plaque which is outside the scope of this invention and which was found to have the following properties: oxygen transmission rate 40.2 cc./mil/100 inches$^2$/24 hours/atmosphere, flexural modulus 480,000 psi and ASTM heat-distortion temperature 86° C. at 264 psi.

C. A repeat of A above using 100 parts by weight of the 80:20 acrylonitrile:styrene copolymer produced a plaque which is outside the scope of this invention having the following properties: oxygen transmission rate 0.6 cc./mil/100 inches$^2$/24 hours/atmosphere, flexural modulus 640,100 psi and ASTM heat-distortion temperature 93° C. at 264 psi.

EXAMPLE 2

A repeat of Example 1A using 50 parts by weight of the 60:40 copolymer of methyl methacrylate:styrene and 50 parts by weight of the copolymer of 80:20 acrylonitrile:styrene produced a blend having an oxygen transmission rate of 3.6 cc./mil/100 inches$^2$/24 hours/atmosphere, a flexural modulus of 570,000 psi and an ASTM heat-distortion temperature of 88° C. at 264 psi.

EXAMPLE 3

A repeat of Example 1A using 15 parts by weight of the 60:40 copolymer of methyl methacrylate:styrene and 85 parts by weight of the 80:20 copolymer of acrylonitrile:styrene produced a blend having an oxygen transmission rate of 1.0 cc./mil/100 inches$^2$/24 hours/atmosphere, a flexural modulus of 600,000 psi and an ASTM heat-distortion temperature of 93° C. at 264 psi.

EXAMPLE 4

A. The procedure of Example 1A was repeated using 15 parts of the 60:40 copolymer of methyl methacrylate:styrene and 85 parts of a uniform copolymer of 70:30 percent by weight of acrylonitrile:styrene prepared in the presence of 5 parts by weight of a styrene:-butadiene rubber (30:70). The resulting blend had the following properties: oxygen transmission rate 1.9 cc./mil/100 inches$^2$/24 hours/atmosphere, flexural modulus 540,000 psi and ASTM heat-distortion temperature 92° C. at 264 psi.

B. A repeat of A of this example using 100 parts of the rubber-modified acrylonitrile:styrene copolymer and no methyl methacrylate:styrene copolymer produced a material which is outside the scope of this invention having the following properties: oxygen transmission rate 3.0 cc./mil/100 inches$^2$/24 hours/atmosphere, flex-ural modulus 500,000 psi and ASTM heat-distortion temperature 90° C. at 264 psi.

I claim:

1. A blend of from 2 to 60% by weight of
   I. a copolymer of from about 50 to 70% by weight of methyl methacrylate and correspondingly from about 50 to 30% by weight of styrene, and from 98 to 40% by weight of
   II. a copolymer prepared by the polymerization of 100 parts by weight of
      (A) more than 50% by weight of at least one nitrile having the structure

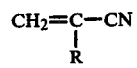

wherein R is hydrogen, a lower alkyl group having from 1 to 4 carbon atoms, or a halogen,
      (B) less than 50% by weight based on the combined weights of (A) plus (B) of styrene, in the presence of from 0 to 40 parts by weight of
      (C) a rubbery polymer of a conjugated diene monomer selected from the group consisting of butadiene and isoprene and optionally at least one comonomer selected from the group consisting of styrene, a nitrile monomer having the structure

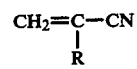

wherein R has the foregoing designation, and an ester having the structure

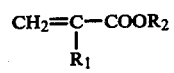

wherein $R_1$ is hydrogen, an alkyl group having from 1 to 4 carbon atoms, or a halogen, and $R_2$ is an alkyl group having from 1 to 6 carbon atoms, said rubbery polymer containing from 50 to 100% by weight of polymerized conjugated diene and from 0 to 50% by weight of comonomer.

2. The blend of claim 1 wherein II(A) is acrylonitrile.
3. The blend of claim 2 wherein II(C) is a butadiene-styrene rubber.
4. The blend of claim 1 wherein II(A) is present in from 70 to 90% by weight and II(B) is present in from 10 to 30% by weight.
5. The blend of claim 4 wherein II(A) is acrylonitrile.
6. The blend of claim 5 wherein II(C) is a butadiene-styrene rubber.

* * * * *